United States Patent [19]

Chuang et al.

[11] Patent Number: 6,159,522
[45] Date of Patent: Dec. 12, 2000

[54] HIGH PERFORMANCE TITANIUM DIOXIDE CLOUDING AGENT AND METHOD OF MANUFACTURE THEREOF

[75] Inventors: Locus Yaw-Jen Chuang, New York; Jane L. MacDonald, Yorktown Heights, both of N.Y.

[73] Assignee: Kraft Foods, Inc., Northfield, Ill.

[21] Appl. No.: 09/388,849

[22] Filed: Sep. 2, 1999

[51] Int. Cl.[7] .................................................. A23L 2/62
[52] U.S. Cl. ..................... 426/590; 426/519; 426/573; 426/575; 426/599; 426/661
[58] Field of Search .................... 426/590, 599, 426/573, 575, 661, 519

[56] References Cited

U.S. PATENT DOCUMENTS 4,187,326   2/1980  Serafino et al. ..................... 426/590
4,529,613   7/1985  Mezzino et al. ..................... 426/590
4,612,204   9/1986  Huffman ............................. 426/590

*Primary Examiner*—Helen Pratt
*Attorney, Agent, or Firm*—Thomas R. Savoie; Thomas A. Marcoux

[57] ABSTRACT

A clouding agent for dry beverage mixes is prepared by first forming a mixture of titanium dioxide and water and then subjecting the mixture to high speed shear. A spacing agent and suspending agent are then added to the mixture and the mixture is again subjected to a high speed shear, followed by spray drying. The resultant clouding agent may contain higher quantities of titanium dioxide than conventional clouding agents to thereby provide increased opacity without increased sedimentation. Further, the method of the invention provides higher throughput through the spray dryer and better yields than conventional methods of preparation.

15 Claims, No Drawings

HIGH PERFORMANCE TITANIUM DIOXIDE CLOUDING AGENT AND METHOD OF MANUFACTURE THEREOF

FIELD OF THE INVENTION

The present invention is directed to a titanium dioxide-containing clouding agent for particulate dry beverage mixes and to a method of producing the clouding agent which provides a higher throughput better yield and higher titanium dioxide content than conventional methods of manufacturing such clouding agents.

BACKGROUND OF THE INVENTION

Dry beverage mixes, particularly imitation fruit juice beverage mixes, are typically formulated with a particulate clouding agent in order to imitate the opacity of a natural juice. Most clouding agents are prepared by combining a spacing agent such as maltodextrin, a suspending agent such as gum arabic, and titanium dioxide. Titanium dioxide is the key ingredient which provides opacity in the clouding agent. U.S. Pat. No. 4,187,326 to Serafino et al. discloses a particulate clouding composition for dry mix beverages containing $TiO_2$. U.S. Pat. No. 4,529,613 to Mezzino et al. describes a particulate, dry beverage mix clouding agent containing up to 20% by weight $TiO_2$.

In typical methods of preparing a clouding agent, including the methods described in U.S. Pat. Nos. 4,187,326 and 4,529,613, the spacing agent and suspending agent are added to water and subjected to high shear mixing. The titanium dioxide is added after the spacing agent and suspending agents are dispersed by the initial high shear mixing and the mixture is again subjected to further high shear mixing. The resulting slurry is then dried, typically by spray drying. The resulting co-dried clouding agent may then be included in a dry beverage mix, particularly a fruit flavored dry beverage mix.

There are several drawbacks associated with conventional clouding agents and methods of preparation thereof. One problem is that while it is desirable to have a relatively high level of titanium dioxide to provide the right opacity, the amount of titanium dioxide which may be included in the clouding agent is limited because of its tendency to precipitate out and create sedimentation in the reconstituted beverage. Another problem is that in conventional methods of preparing clouding agents, the processing rates are slowed because the inner surfaces of the processing vessels tend to become caked, requiring significant cleaning efforts before subsequent batches may be manufactured. Loss of the ingredients in this way also reduces yield. It has been found that in these prior art processes, higher titanium dioxide content in the slurry made it harder to spray dry the slurry, further reducing yield and lowering throughput.

Accordingly, there is a need for a clouding agent having increased opacity on an equal weight basis and a process of manufacture thereof which reduces undesirable buildup of material on the sides of the mixing tank thereby improving the throughput and yield of the process.

SUMMARY OF THE INVENTION

The foregoing and other objects which will be apparent to those of ordinary skill in the art are achieved in accordance with the invention by providing a method of making a particulate clouding agent for a dry beverage mix comprising: (a.) subjecting particulate titanium dioxide and water to high shear mixing to form a first aqueous mixture; (b.) adding a spacing agent and a suspending agent to said first aqueous mixture to form a second mixture; (c.) subjecting the second mixture to high shear mixing to form a further aqueous mixture; and (d.) spray drying the second aqueous mixture to form a particulate clouding agent, thereby providing an improved particulate dry mix beverage clouding agent comprising $TiO_2$, spacing agent, and suspending agent in which the $TiO_2$ content is from 21 to 30% by weight based on the total weight of the clouding agent on a dry weight basis, and by providing a particulate dry beverage mix including the improved clouding agent.

The particulate titanium dioxide and other constituents of the clouding agent are food grade. The titanium dioxide has an average particle size of 0.3 microns with a particle size distribution of 100% through a 200 mesh screen. Mesh size referred to in the present specification is U.S. mesh size unless indicated to the contrary. The $TiO_2$ is preferably a purified inorganic white, named by the 1971 Colour Index, 6 pigment white 6, C.I. 77891, and available commercially from Wittaker, Clark & Daniels, Inc., South Plainfield, N.J. or Warner-Jenkinson, St. Louis, Mo.

The spacing agent, which is also referred to in the art as a carrier or bulling agent or filler, functions to disperse and maintain the titanium dioxide as separate particles. The spacing agent, which typically has a particle size distribution of 90% minimum through 140 mesh and 50% maximum through 325 mesh, is suitably a water-soluble, polymeric substance, including maltodextrins and other starch hydrolyzates. Suitable spacing agents are described in U.S. Pat. No. 4,187,326 and U.S. Pat. No. 4,529,613, the disclosures of which are herein incorporated by reference. Maltodextrins, which are starch hydrolyates produced by converting refined corn starch into nutritive saccharides through the use of acids or enzymes, are preferred. Suitable maltodextrins are bland in flavor and without appreciable sweetness. Preferred maltodexrins have a DE of less than 20, and more preferably from 10 to 20. Other suitable spacing agents, when employed, are preferably used in combination with the preferred maltodextrin spacing agent.

The suspending agent is suitably a gum, such as gum arabic, xanthan gum, or a pectic substance such as pectin. Suitable suspending agents are described in U.S. Pat. No. 4,187,326 and U.S. Pat. No. 4,529,613.

In the method of this invention, the solids are subjected to high shear mixing with water. Various types of high shear mixers may be employed such as those described in U.S. Pat. No. 4,187,326 and U.S. Pat. No. 4,529,613. A homogenizer is preferred, and an in-line 3-stage homogenizer is particularly preferred. A suitable shear rate of mixing is generally in the range of 3000 rpms to 4000 rpms. In general, a mixing time of from 10 to 60 minutes for each high shear mixing step is suitable.

It is a key aspect of the invention that a $TiO_2$-water mixture is formed first and subjected to high shear mixing as described above before addition of the spacing agent or suspending agent. The spacing and suspending agent may then be added either simultaneously or sequentially, in which case the spacing agent may be added prior to the suspending agent or vice versa. In each of these process variations, however, the mixture is subjected to high shear mixing as described above as each ingredient is added.

The total amount of the key ingredients ($TiO_2$ spacing agent, and suspending agent) is suitably from 20 to 45% and preferably 25 to 35% by weight based on the aqueous mixture. The total amount of the $TiO_2$, based on the total weight of the key ingredients, is at least 21% by weight, on a dry weight basis. As mentioned above, it has previously proven difficult to obtain a satisfactory clouding agent having a high $TiO_2$ content. Preferably, the total amount of $TiO_2$ based on the total weight of the key ingredients for the clouding agent of this invention, is from 23 to 30% by weight, on a dry weight basis. The spacing agent is suitably present in an amount of 40 to 70% by weight and preferably in an amount of 50 to 60% by weight, on the same basis. The suspending agent is suitably present in an amount of 10 to 30% by weight and preferably from 15 to 25% by weight, on the same basis.

Water content of the aqueous mixture is suitably 55 to 80%, and preferably 65 to 75% by weight, based on the weight of the aqueous mixture.

After preparation of the aqueous mixture by high shear mixing as described above, the aqueous mixture is dried, preferably by spray drying, to form a particulate, co-dried clouding agent for a dry beverage mix. Other methods of drying, such as freeze drying, fluidized bed drying, vacuum drying, air drying, or drum drying may be used.

The amount of the key ingredients in the dried product will be the same as given above. Moisture content of the dried product is suitably less than 6% and preferably less than 5% by weight, based on the weight of the product.

A flow control agent is preferably included to enhance flow of the particulate product. A particulate flow control agent, such as tricalcium phosphate ("TCP"), is preferred. TCP is preferably included in a spray dried product by addition as a particulate powder to the spray drying tower. The amount of flow control agent is suitably from 0.1 to 5% and preferably 1 to 3% by weight based on the weight of the dried product The particulate clouding agent is intended to be utilized in dry beverage mixes such as those described in U.S. Pat. No. 4,187,326 and U.S. Pat. No. 4,529,613. Preferred dry beverage mixes are fruit-flavored and may include a natural and/or artificial sweetener. Typical ingredients of such dry beverage mixes include food grade acids, such as tartaric acid and citric acid, coloring, fruit or other flavors, and other ingredients such as vitamins. The amount of clouding agent included in a dry beverage mix is suitably from 0.1 to 10% and preferably from 0.5 to 5.0% by weight based on the weight of the sweetener-free dry beverage mix. The particle size of the particulate clouding agent is suitably 90% minimum through 140 mesh and 50% maximum through 325 mesh.

EXAMPLE 1

830 gallons of room temperature water is added to an agitated kettle equipped with a Greerco Corp. (Hudson, N.H.), in-line, 3-stage homogenizer. The agitator within the kettle was obtained from Chemineer, Inc. (Dayton, Ohio). The agitator and in-line homogenizer were started up at shear rates of about 34 rpms and 3430 rpms, respectively. 1000 pounds of $TiO_2$ (average particle size 0.3 microns) was added to the kettle and high shear mixing was continued for 30 minutes. 787.2 pounds of gum arabic was then fed into the circulating mixture and the high shear mixing is continued for an additional 30 minutes. 2,212.8 pounds of 15 D.E. maltodextrin (LoDex™ 15—Grain Processing Corp; Muscatine, Iowa) is added to the circulating mixture and high shear mixing is again continued for an additional 30 minutes.

The mixture is then heated to 150 to 160° F. The heated mixture is then transferred to a mixing tank and subjected to high shear mixing for at least 90 minutes while maintaining a temperature of 150 to 160° F. Mixing the heated mixture is continued until the mixture is fed to a spray-drying tower. The mixture, which contains 35% by weight solids, is then spray dried. During spray drying, 81.6 lbs. of particulate tricalcium phosphate is metered to the spray drying tower to provide a TCP content of 2% by weight in the spray dried product.

The empty mixing tank is observed to be clean, with little or no material stuck to the bottom or side walls. The particular spray-dried product has a moisture content of about 4.5% by weight and a particle size distribution of 100% through 60 mesh, at least 99% through 100 mesh, at least 90% through 140 mesh, and at most 50% through 325 mesh.

The solids content of the spray dried product, on a dry basis, is:

| Ingredient | Amount (% by weight) |
| --- | --- |
| $TiO_2$ | 24.5 |
| Maltodextrin-LoDex 15 | 54.2 |
| Gum Arabic | 19.3 |
| TCP | 2 |
| Total | 100 |

EXAMPLE 2

The procedure of Example 1 is followed except that the spacing agent (maltodextrin) is added prior to the suspending agent (gum arabic). After feeding the contents of the mixing tank to the spray drier, the mixing tank is observed to be clean, with little or no material stuck to the bottom of side wall of the tank.

COMPARISON EXAMPLE A

The procedure of Example 1 is followed except that the sequence of introduction of ingredients is changed. In Example 1, $TiO_2$ is added first, followed by the suspending agent and then the spacing agent. In Example 2, $TiO_2$ is added first, followed by the spacing agent and then the suspending agent. In this comparison example, the suspending agent (gum arabic) is added first followed by $TiO_2$ and then by the spacing agent (maltodextrin). The processing vessels are observed to have a sticky deposit of material, requiring cleaning. As compared to Examples 1 and 2, the throughput and yield are therefore lower and the measured opacity is lower while the measured sedimentation rate is higher.

COMPARISON EXAMPLE B

The procedure of Comparison Example A is followed, except that the sequence of addition of the ingredients is changed. In this example, the spacing agent is introduced first, followed by $TiO_2$ and then by the suspending agent. Again, a substantial amount of material remains adhered to the processing vessels. As compared to Examples 1 and 2, the throughput, yield, and opacity are lower and sedimentation rate is higher.

COMPARISON EXAMPLE C

The procedure of Comparison Example 1 is followed except that the sequence of the introduction of the ingredients is suspending agent first, then spacing agent, then $TiO_2$, the amount of $TiO_2$ is reduced, and the amount of spacing agent is increased by a corresponding amount. The composition of the spray dried clouding agent, on a dry basis, is:

| Ingredient | Amount (% by weight) |
|---|---|
| $TiO_2$ | 19 |
| Spacing Agent | 60 |
| Suspending Agent | 19 |
| TCP | 2 |

Example C had the expected lower $TiO_2$ loading. There was again a coating of material in the empty tanks resulting in a reduced yield versus Example 1 and 2, and it was more difficult to pump the aqueous mixture to and through the nozzles of the spray drier resulting in a reduced throughput versus Examples 1 and 2. The sedimentation rate for Example C was equivalent to Examples 1 and 2. The opacity for Example C was equivalent to Examples 1 and 2 on an equal $TiO_2$ weight basis; but significantly lower than Examples 1 and 2 on an equal clouding agent basis.

COMPARISON EXAMPLE D

The procedure of Comparison Example C is followed except that the amount of $TiO_2$ is raised from 19 to 25%, and the amount of spacing agent is reduced by a corresponding amount. The composition of the spray dried clouding agent, on a dry basis, is:

| Ingredient | Amount (% by weight) |
|---|---|
| $TiO_2$ | 25 |
| Spacing Agent | 54 |
| Suspending Agent | 19 |
| TCP | 2 |

As compared to Examples 1 and 2, Example D had a lower yield due to build-up on equipment surfaces, lower throughput due to a lower feed rate to spray tower. The resulting clouding agent had a lower opacity on an equal weight basis, and a higher sedimentation rate.

Evaluation of Cloud Compositions

The cloud compositions of Examples 1–2 and of Comparison Examples A–D are evaluated for opacity and sedimentation rate as determined by the procedures described below. Results are as follows:

| Example | Average Opacity | Sedimentation Rate |
|---|---|---|
| 1 | 45% transmission | 0.25 cm after 1 week |
| 2 | 45% transmission | 0.25 cm after 1 week |
| A | 60% transmission | 2.5 cm after 1 week |
| B | 60% transmission | 2.5 cm after 1 week |
| C | 70% transmission | 0.25 cm after 1 week |
| D | 60% transmission | 2.5 cm after 1 week |

Test Procedure

Opacity—a measurement of the % light transmission through a standardized aqueous medium containing equal weight levels of the clouding agent as measured by a Spectrometer™ 20 (Spectronic Instruments Co. Rochester, N.Y.) at a wavelength of 600 nm.

Sedimentation Rate—a standardized beverage from reconstituted powdered soft drink mix and containing equal amounts of $TiO_2$ is filled into an Imhoff™ cone (Fisher Scientific, Inc., Specialty Glass Division—Springfield, N.J.). The beverage is allowed to stand still for the test period after which the height of $TiO_2$ sediment residing at the bottom of the cone is measured.

Throughput—a measurement of production rate (pounds/hour of clouding agent) collected as product from the spray tower. Production rates 67% higher have been achieved through the use of this invention as compared to prior art procedures.

Yield—a measurement (expressed as a %) of the dry-weight of collected product from the spray tower versus the dry weight of starting materials. Yield increases of 3.5% have been achieved throughout the use of this invention as compared to prior art procedures.

Although not wishing to be limited to any specific theory, it is believed that when $TiO_2$ is mixed and subjected to high shear in the presence of water alone, the resulting $TiO_2$ particles have a preferred small size and/or physical structure that is not achieved when a spacing agent and/or suspending agent is also present. The preferred $TiO_2$ particles may be able to bind with the subsequently introduced spacing agent and/or suspending agent in a manner not heretofore obtained.

Although the invention has been described in considerable detail with respect to preferred embodiments thereof, variations and modifications will be apparent to those skilled in the art without departing from the spirit and scope of the invention set forth in the claims.

What is claimed is:

1. A method of making a particulate clouding agent for a dry beverage mix comprising:
   (a.) subjecting particulate titanium dioxide and water to high shear mixing to form a first aqueous mixture;
   (b.) adding a spacing agent and a suspending agent to said first aqueous mixture and subjecting the mixture to high shear mixing to form a further aqueous mixture; and
   (c.) drying the further aqueous mixture to form a particulate clouding agent.

2. The method according to claim 1 wherein step (b.) comprises adding said spacing agent and said suspending agent sequentially and subjecting the mixture to said high shear mixing after addition of said spacing agent and after addition of said suspending agent.

3. The method according to claim 1 wherein said spacing agent and said suspending agent are added simultaneously.

4. The method according to claim 1 wherein the total amount of $TiO_2$, spacing agent, and suspending agent in said further aqueous mixture is from 20 to 45% by weight, based on the weight of said further aqueous mixture.

5. The method according to claim 4 wherein the total amount of $TiO_2$, spacing agent and suspending agent on a dry weight basis comprises:
   from 21 to 30% by weight $TiO_2$,
   from 50 to 60% by weight spacing agent, and
   from 10 to 30% by weight suspending agent.

6. The methods according to claim 1 wherein the further aqueous mixture is spray-dried.

7. The method according to claim 1 further comprising incorporating a flow control agent in said particulate clouding agent.

8. The method according to claim 1 wherein each high shear mixing step is effected for a period of time of from 10 to 30 minutes.

9. The method according to claim 8 wherein said suspending agent is a hydrocolloid gum.

10. The method according to claim 1 wherein said spacing agent is at least one member selected from the group consisting of:

maltodextrin, starch hydrolyzates or sugars.

11. A particulate, co-dried clouding agent produced by the method of claim 1 wherein the dry clouding agent has a $TiO_2$ content of from 21 to 30% by weight based on the total dry weight of $TiO_2$, spacing agent and suspending agent.

12. A co-dried clouding agent according to claim 11, wherein said spacing agent is present in an amount of from 50 to 60% by weight and said suspending agent is present in an amount of from 10 to 30% by weight based on the total weight of the $TiO_2$, spacing agent, and suspending agent, on a dry weight basis.

13. A co-dried clouding agent according to claim 11 further comprising from 1 to 3% by weight of a flow control agent based on the weight of the clouding agent.

14. A co-dried clouding agent according to claim 11 wherein said spacing agent is a maltodextrin and wherein said suspending agent is gum arabic.

15. A particulate, co-dried clouding agent according to claim 11 wherein the clouding agent is a spray dried material.

* * * * *